US012754879B2

(12) United States Patent
Mamontov

(10) Patent No.: US 12,754,879 B2
(45) Date of Patent: Oct. 6, 2026

(54) INTEGRITY OF PORTABLE EXECUTABLES IN DEPLOYMENT PACKAGES

(71) Applicant: VARONIS SYSTEMS, INC., New York, NY (US)

(72) Inventor: Alexey Mamontov, Ramat Gan (IL)

(73) Assignee: VARONIS SYSTEMS, INC., New York, NY (US)

( * ) Notice: Subject to any disclaimer, the term of this patent is extended or adjusted under 35 U.S.C. 154(b) by 0 days.

(21) Appl. No.: 18/732,019

(22) Filed: Jun. 3, 2024

(65) Prior Publication Data

US 2025/0370955 A1 Dec. 4, 2025

(51) Int. Cl.
*G06F 16/11* (2019.01)
*G06F 16/13* (2019.01)

(52) U.S. Cl.
CPC .......... *G06F 16/116* (2019.01); *G06F 16/137* (2019.01)

(58) Field of Classification Search
CPC ............................. G06F 16/116; G06F 16/137
USPC ................................ 707/698, 741, 747, 756
See application file for complete search history.

(56) References Cited

U.S. PATENT DOCUMENTS 7,478,431 B1 1/2009 Nachenberg
8,352,484 B1 * 1/2013 Schneider ............. G06F 21/565 707/758
8,621,625 B1 12/2013 Bogorad et al.
12,086,234 B2 * 9/2024 Vijayvargiya .......... G06F 21/53
2006/0026569 A1 2/2006 Oerting et al.
2006/0161761 A1 * 7/2006 Schwartz ................ G06F 21/64 711/216
2015/0020203 A1 * 1/2015 Xie ....................... G06F 21/562 726/24
2020/0106775 A1 * 4/2020 Zeng ..................... H04W 12/06
(Continued)

FOREIGN PATENT DOCUMENTS

CN 106446676 5/2019
EP 2819054 A1 12/2014
WO 2015/135286 9/2015

OTHER PUBLICATIONS

Zeltser, L., "Tools for Analyzing Static Properties of Suspicious Files on Windows," SANS Digital Forensics and Incident Response Blog, Mar. 4, 2014 (https://www.sans.org/blog/tools-for-analyzing-static-properties-of-suspicious-files-on-windows/).
(Continued)

*Primary Examiner* — Phong H Nguyen
(74) *Attorney, Agent, or Firm* — Sughrue Mion, PLLC

(57) ABSTRACT

A computer-implemented method is provided for use with a package repository including software packages that include source portable and linkable executable files. The method includes populating a mapping database by, for each of a plurality of the source portable and linkable executable files having a file format: calculating a hash value of a pre-defined subset of sections of the source portable and linkable executable file, the pre-defined subset defined for the file format and including fewer than all of the sections specified by the file format; and storing, in the mapping database, the calculated hash value in association with (a) an identifier of the source portable and linkable executable file and (b) an identifier of the software package of the source portable and linkable executable file. Other embodiments are also described.

28 Claims, 7 Drawing Sheets

(56) References Cited

U.S. PATENT DOCUMENTS

2021/0314171 A1* 10/2021 Choyi .................. H04L 9/3247

OTHER PUBLICATIONS

"What Is an SBOM Generator and How and When Should You Generate SBOMs?" CYBEATS Blog, Mar. 28, 2023.
"The Minimum Elements For a Software Bill of Materials (SBOM)," The United States Department of Commerce, Jul. 12, 2021.
Shiel, Ian, and Stephen O'Shaughnessy. "Improving file-level fuzzy hashes for malware variant classification." Digital Investigation 28 (2019): S88-S94.
Snoke, T., and Jacobs, M., 2023: Detecting and Grouping Malware Using Section Hashes. Carnegie Mellon University, Software Engineering Institute's Insights (blog), Jun. 5, 2023 https://doi.org/10.58012/arq8-ed35. https://insights.sei.cmu.edu/blog/detecting-and-grouping-malware-using-section-hashes/.
Jansen, S. et al., "SearchSECO: A Worldwide Index of the Open Source Software Ecosystem. In M. Papadakis, & M. Cordy (Eds.), Proceedings of the 19th Belgium-Netherlands Software Evolution Workshop," BENEVOL 2020, Luxembourg, Dec. 3-4, 2020 (vol. 2912). (CEUR Workshop Proceedings). CEUR-WS.org. http://ceur-ws.org/Vol-2912/./paper3.pdf.
Boucher N., Anderson R, "Automatic Bill of Materials," arXiv preprint arXiv:2310.09742. Oct. 15, 2023.
Communications Security, Reliability, and Interoperability Council VIII, Sep. 2022.
Grigorian, A., "A Competition Analysis of Software Assurance Tools," 2022.
SecureSeco, downloaded Mar. 21, 2024.
International Search Report with the Written Opinion of the International Searching Authority issued Jul. 18, 2025 in Application No. PCT/IL2025/050466.

* cited by examiner

70

94

74

| SOURCE SOFTWARE PACKAGE | | |
|---|---|---|
| NAME | VERSION | STATUS |
| Protobuf40 | 3.1.0 | SUPPORTED |
| DbgHelp | 10.0.25921.1001 | NON-SUPPORTED |

34

FIG. 5

FIG. 7

82 92 94 85

| FOLDER | FILENAME | FILEVERSION | SOURCE SOFTWARE PACKAGE | | VULNERABILITIES | SECTIONS HASH | NOT ASSOCI-ATED |
|---|---|---|---|---|---|---|---|
| | | | NAME | VERSION | | | |
| Tools\Shipper | dbghelp.dll | 10.0.25921.1001 (WinBuild.160101.0800) | DbgHelp | 10.0.25921.1001 | Vulnerability Critical (9.8) CVE-2023-45853 | 5s064ZfZvlMSSylCOA5QTeYFEU8= | |
| Tools\Shipper | Google.Protobuf.dll | 3.23.0.3 | Protobuf40 | 3.1.0 | Vulnerability deprecated: Unlisted @ November 12 2015 | iQ4GIFmJ3v13UXxlR+S61GUKM8= | |
| Tools\Shipper\amd64 | msdia140.dll | 14.36.32541.0 | microsoft.diagnostics.tracing.traceevent | 3.1.7 | Vulnerability Critical (9.8) CVE-2023-45853 | aj3qeUGQU44kGxOtw9AI9Nz1Wu8= | |
| Varonis.AlertsEngine.Setup.msi\Varonis\Data Classification | System.Text.Encoding.CodePages.dll | 4.6.24705.01 | system.text.encoding.codepages | 5.0.0 | Vulnerability deprecated: End of Life @ November 09 2020 | P8+gfz15Z4+ydt4TxyffD6mSSok= | |
| Varonis.AlertsEngine.Setup.msi\Varonis\Data Classification\OIlink | imcd72.dll | 8.5.7.241.2401241133 | nuget-local-external-cloud\Contrib.OracleOutsideIn.Native.9.5.7.nupkg | 9.5.7 | Vulnerability Critical (9.8) CVE-2022-37434 Vulnerability High (7.5) CVE-2018-25032 | 6Bx2L7Imkta/A3NVAMMGExebOtU= | |
| Varonis.AlertsEngine.Setup.msi\Varonis\Data Classification\OIlink | impsi2.dll | 8.5.7.241.2401241133 | Contrib.OracleOutsideIn.Native | 9.5.7 | Vulnerability Critical (9.8) CVE-2023-45853 | 9yqUxdkRrOx9+kIVC/GUI4afysM= | |
| Varonis.AlertsEngine.Setup.msi\Varonis\Data Classification\OIlink | sccfnt.dll | 8.5.7.241.2401241133 | Contrib.OracleOutsideIn.Native | 9.5.7 | Vulnerability Critical (9.8) CVE-2023-45853 | 55lgH/q24bY3DltsJjaaSMqh37s= | |
| Varonis.AlertsEngine.Setup.msi\Varonis\Data Classification\OIlink | wvcore.dll | 8.5.7.241.2401241133 | Contrib.OracleOutsideIn.Native | 9.5.7 | Vulnerability Critical (9.8) CVE-2023-45853 | NUwPy4Te5rOvar8r0WsIRE0WxuM= | |
| Varonis.AlertsEngine.Setup.msi\Varonis\Data Classification\OIlink | core3.dll | 1.3.7.23 | | | | UNxPy4Te5rOvar9r0WtlSE0WxuP= | TRUE |
| Varonis.DDA.Setup.msi\Varonis\DatAdvantage\DeploymentAgent\11.0.91 | Microsoft.DiaSymReader.Native.amd64.dll | 14.29.30152.0 built by: cloudtest | microsoft.netcore.app.runtime.win-x64 | 6.0.25 | Vulnerability Critical (9.8) CVE-2022-37434 Vulnerability High (7.5) CVE-2018-25032 | 7DTtGkm9sqfZkrc6KSjE83sIONY= | |
| Varonis.DW.ServicePkg\Code | aspnetcorev2_inprocess.dll | 16.0.23296.25 | microsoft.aspnetcore.app.runtime.win-x64 | 6.0.25 | Vulnerability critical: GHSA-g74q-5xw3-j7q9(CVE-2024-21386 @ February 13 2024) | 7p8qYW+ww8/6XHQ8j5ARIgXPYbw= | |
| Varonis.Edge.SlimAgent.Setup.msi\Varonis\Edge\Slim Agent | System.Security.Cryptography.Xml.dll | 4.6.26515.06 | System.Security.Cryptography.Xml | 4.5.0 | Vulnerability critical: GHSA-vh55-786g-wjwj @ August 10 2022 | 2mD7QQLWJunHJumbmx1LsD9wpbM= | |
| Varonis.GridCollector.Setup.x86.msi\Varonis\GridCollector\Labeling\x64 | mip_ClientTelemetry.dll | 3.7.264.1 | microsoft.informationprotection.file | 1.14.108 | Vulnerability Critical (9.8) CVE-2022-37434 Vulnerability High (7.5) CVE-2018-25032 | 0JsyxTQof/A/+8JWG2Cf2dcf0I0= | |
| Varonis.GridCollector.Setup.x86.msi\Varonis\GridCollector\Labeling\x64 | mip_file_sdk.dll | 1.14.108 | microsoft.informationprotection.file | 1.14.108 | Vulnerability Critical (9.8) CVE-2023-45853 | EX6PuxCTc2im8ovcKSie3iJSRe8= | |
| Varonis.GridCollector.Setup.x86.msi\Varonis\GridCollector\Labeling\x64 | zlib2.dll | 1.2.11 (extracted from strings) | | | | XE8PytCTc3im8ovcKSie3iJSRe7= | TRUE |
| Varonis.GridCollector.Setup.x86.msi\Varonis\GridCollector\Labeling\x64 | zlib1.dll | 1.2.13 (extracted from strings) | microsoft.informationprotection.file | 1.13.187 | Vulnerability Critical (9.8) CVE-2023-45853 | SzvJ90GTlySK3Vo9+ESXQ6MMMfM= | |

90 102 102 104 104

INTEGRITY OF PORTABLE EXECUTABLES IN DEPLOYMENT PACKAGES

FIELD OF THE APPLICATION

The present application relates generally to identifying risks in software code and generating software bills of materials.

BACKGROUND OF THE APPLICATION

As is known in the software development art, portable executable and linkable files are binary executable formats, which include binary application code, data, meta data, and additional information organized in various sections defined by the format. The two most common file formats in use today are the Portable Executable (PE) format, which is primarily used in Windows® systems, and the Executable and Linkable Format (ELF), which is commonly used in Unix-like operating systems.

SUMMARY OF THE APPLICATION

In some embodiments of the present invention, a development and deployment environment is provided that comprises a computing system comprising a mapping database, and a package repository including software packages that include a plurality of source portable and linkable executable files. The source portable and linkable executable files of the software packages often undergo one or more transformations between initial downloading and distribution as deployed portable and linkable executable files as part of a deployment package. The transformations may include, for example, digital signing, re-versioning, attachment of debugging information, license updates, modification of icons, modification of metadata, and other non-functional modifications.

Thus, the deployed version of any given portable and linkable executable files may have a binary that differs from the original binary in its source software package. These differences may or may not affect the functionality or other deployment properties of the portable and linkable executable files.

In some embodiments of the present invention, a computer-implemented mapping method is provided for use with the package repository. The mapping method comprises populating the mapping database by, for each of the plurality of the source portable and linkable executable files having a file format:

- calculating a hash value of a pre-defined subset of sections of the source portable and linkable executable file, the pre-defined subset defined for the file format and including fewer than all of the sections specified by the file format; and
- storing, in the mapping database, the calculated hash value in association with (a) an identifier of the source portable and linkable executable file and (b) an identifier of the software package of the source portable and linkable executable file.

The pre-defined subset of sections of the source portable and linkable executable file typically includes essential significant sections of the compiled source portable and linkable executable file, which contribute to the functionality of the code. For example, the pre-defined subset of the sections may include a code segment (e.g., a .text section in PE format and in Executable and Linkable Format (ELF)), and a data segment that includes initialized static variables, such as global variables and/or static local variables (e.g., a .data section in PE format and in ELF, and/or .pdata and/or .rdata sections in PE format).

By contrast, the pre-defined subset of sections of the source portable and linkable executable file typically does not include non-essential sections of the compiled source portable and linkable executable file, which do not contribute to the functionality of the code. For example, the pre-defined subset of the sections typically does not include a resource section (e.g., a .rsrc section in PE format); a .reloc section in PE format; any undefined regions within the sections in PE format, which typically include assembly signatures; and/or a .bss section, a .debug section, a .strtab section, or a .symtab section in ELF.

For some applications, the mapping method further comprises defining a manifest specifying the sections of the pre-defined subset for the file format. Providing one or more manifests may enable customization and adaptation to different deployment scenarios and environments.

In some embodiments of the present invention, a computer-implemented deployment package assessment method is provided for use with the mapping database. Typically, this method is performed after one or more performances of the mapping method to populate the mapping database, as described hereinabove. The deployment package assessment method attempts to quickly match deployed portable and linkable executable file with their respective source software packages, even though the deployed portable and linkable executable files often differ from their corresponding source portable and linkable executable files in ways that do not contribute to the functionality of the executable files.

The deployment package assessment method comprises, for at least a portion of (e.g., all of) deployed portable and linkable executable files that are included in the deployment package and have the file format of the source portable and linkable executable files stored in the mapping database:

- calculating a hash value of the pre-defined subset of the sections of the deployed portable and linkable executable file,
- looking up the calculated hash value of the deployed portable and linkable executable file in the mapping database (in order to find the associated software package, if any),
- if the calculated hash value is found in the mapping database, triggering a rule associated with a status of the software package containing the source portable and linkable executable file corresponding, based on the calculated hash value, to the deployed portable and linkable executable file, and
- if the calculated hash value is not found in the mapping database, triggering a not-found rule.

As described above, the hash values are calculated only for the pre-defined subset of the sections. Therefore, if the deployed portable and linkable executable file does not have any significant differences from the source portable and linkable executable file, the respective hash values are more likely to match than if the hash values were calculated for the entirety of the deployed portable and linkable executable file and the source portable and linkable executable file. This increased likelihood increases the accuracy of correct matching and reduces the occurrence of false negative failed matches. In the absence of the techniques described herein, failed matches may often be considered false negatives in the sense that the lack of matching does not reflect any change to the functionality of the deployed code.

In some embodiments of the present invention, a computer-implemented method is provided for generating a software bill of materials (SBOM) for the deployment package. Typically, the SBOM-generation method is performed after one or more performances of the mapping method to populate the mapping database, as described hereinabove.

The SBOM-generation method comprises generating an SBOM for the deployment package, by, for at least a portion of (e.g., all of) the deployed portable and linkable executable files having the file format of the source portable and linkable executable files stored in the mapping database:

calculating a hash value of the pre-defined subset of the sections of the deployed portable and linkable executable file, and looking up the calculated hash value of the deployed portable and linkable executable file in the mapping database.

If the calculated hash value is found in the mapping database, an entry is created in the SBOM that includes at least:

an identifier (e.g., a name) of the deployed portable and linkable executable file (which corresponds to the deployed portable and linkable executable file, based on the calculated hash value), an identifier (e.g., a name and version) of the software package containing the source portable and linkable executable file, and optionally, the hash value.

On the other hand, if the calculated hash value is not found in the mapping database, an entry is created in the SBOM that includes at least:

the identifier of the deployed portable and linkable executable file, and an indicator (e.g., a flag) that the deployed portable and linkable executable file is not associated with any of the software packages contained in the package repository.

The resulting SBOM is generally more accurate than conventional SBOMs, because matches are made between deployed portable and linkable executable files and their source portable and linkable executable files even if the executable files differ in non-functional ways, such as described above. In addition, unlike conventional SBOMs, the SBOM includes deployed portable and linkable executable files that cannot be found in any of the software packages contained in the package repository; these unidentified deployed portable and linkable executable files are flagged with the above-described not-found indicator.

There is therefore provided, in accordance with an application of the present invention, a computer-implemented method for use with a package repository including software packages that include source portable and linkable executable files, the method including:

populating a mapping database by, for each of a plurality of the source portable and linkable executable files having a file format:

calculating a hash value of a pre-defined subset of sections of the source portable and linkable executable file, the pre-defined subset defined for the file format and including fewer than all of the sections specified by the file format; and storing, in the mapping database, the calculated hash value in association with (a) an identifier of the source portable and linkable executable file and (b) an identifier of the software package of the source portable and linkable executable file; and for at least a portion of deployed portable and linkable executable files that are included in a deployment package and have the file format:

calculating a hash value of the pre-defined subset of the sections of the deployed portable and linkable executable file, looking up the calculated hash value of the deployed portable and linkable executable file in the mapping database, if the calculated hash value is found in the mapping database, triggering a rule associated with a status of the software package containing the source portable and linkable executable file corresponding, based on the calculated hash value, to the deployed portable and linkable executable file, and if the calculated hash value is not found in the mapping database, triggering a not-found rule.

For some applications, triggering the not-found rule invokes a process that publishes an alert message.

For some applications, calculating the hash value and looking up the calculated hash value include calculating the hash value and looking up the calculated hash value for all of the deployed portable and linkable executable files having the file format.

For some applications, the pre-defined subset of the sections includes a code segment.

For some applications, the pre-defined subset of the sections includes a data segment that includes initialized static variables.

For some applications, the pre-defined subset of the sections does not include a resource section.

For some applications, the pre-defined subset of the sections includes all sections specified by the file format other than sections included in a pre-defined blacklist that specifies sections for exclusion from the pre-defined subset.

For some applications, the method further includes defining a manifest specifying the sections of the pre-defined subset for the file format. For some of these applications, the manifest is a whitelisting manifest that lists the sections of the pre-defined subset. For others of these applications, the manifest is a blacklisting manifest that lists sections for exclusion from the pre-defined subset, and the pre-defined subset of the sections includes all sections specified by the file format other than the sections listed in the blacklisting manifest.

For some applications, the file format is selected from the group of file formats consisting of: portable Executable (PE) format and Executable and Linkable Format (ELF).

For some applications:

the source portable and linkable executable files are in a plurality of different file formats, pre-defined subsets of the sections are respectively defined for the plurality of different file formats, and include fewer than all of the sections specified by the respective file formats, populating the mapping database includes, for each of the source portable and linkable executable files, calculating the hash value of the pre-defined subset of the sections defined for the file format of the source portable and linkable executable file, and calculating the hash value includes, for the at least a portion of the deployed portable and linkable executable files, calculating the hash value of the pre-defined subset of the sections defined for the file format of the deployed portable and linkable executable file.

For some applications, the method further includes defining, for each of the file formats, a manifest specifying the sections of the pre-defined subset.

For some applications:

the method further includes:

populating a status indication data structure with respective status indicators for the software packages, each of the status indicators selected from a prespecified list of status indicators, and associating respective rules with the status indicators, and wherein, for each of the deployed portable and linkable executable files for which the hash value was found in the mapping database, triggering the rule includes triggering the rule associated with the status indicator of the software package containing the source portable and linkable executable file corresponding, based on the calculated hash value, to the deployed portable and linkable executable file.

For some applications, the rules include:

permitting deployment of the deployment package, and aborting the deployment of the deployment package.

For some applications, the rules include generating a message.

For some applications, the rules include creating a security item in a life cycle management tool associated with the deployment package.

For some applications, the status indicators include a supported status indicator and a non-supported status indicator.

For some applications, the status indicators include a vulnerability status indicator.

For some applications, the status indicators include a licensing status indicator.

For some applications, the status indicators include a known bug status indicator.

There is further provided, in accordance with an application of the present invention, a computer-implemented method for use with a package repository including software packages that include source portable and linkable executable files, the method including:

populating a mapping database by, for each of a plurality of the source portable and linkable executable files having a file format:

calculating a hash value of a pre-defined subset of sections of the source portable and linkable executable file, the pre-defined subset defined for the file format and including fewer than all of the sections specified by the file format; and storing, in the mapping database, the calculated hash value in association with (a) an identifier of the source portable and linkable executable file and (b) an identifier of the software package of the source portable and linkable executable file.

There is still further provided, in accordance with an application of the present invention, a computer-implemented method for use with a package repository including software packages that include source portable and linkable executable files, the method including:

for at least a portion of deployed portable and linkable executable files that are included in a deployment package and have a file format:

calculating a hash value of a pre-defined subset of sections of the deployed portable and linkable executable file, the pre-defined subset defined for the file format and including fewer than all of the sections specified by the file format, looking up the calculated hash value of the deployed portable and linkable executable file in a mapping database populated by, for each of a plurality of the source portable and linkable executable files having the file format:

calculating a hash value of the pre-defined subset of the sections of the source portable and linkable executable file; and storing, in the mapping database, the calculated hash value in association with (a) an identifier of the source portable and linkable executable file and (b) an identifier of the software package of the source portable and linkable executable file, if the calculated hash value is found in the mapping database, triggering a rule associated with a status of the software package containing the source portable and linkable executable file corresponding, based on the calculated hash value, to the deployed portable and linkable executable file, and if the calculated hash value is not found in the mapping database, triggering a not-found rule.

There is additionally provided, in accordance with an application of the present invention, a computer-implemented method for use with a package repository including software packages that include source portable and linkable executable files, the method including:

populating a mapping database by, for each of a plurality of the source portable and linkable executable files having a file format:

calculating a hash value of a pre-defined subset of sections of the source portable and linkable executable file, the pre-defined subset defined for the file format and including fewer than all of the sections specified by the file format; and storing, in the mapping database, the calculated hash value in association with (a) an identifier of the source portable and linkable executable file and (b) an identifier of the software package of the source portable and linkable executable file; and generating a software bill of materials (SBOM) for a deployment package that includes deployed portable and linkable executable files, by, for at least a portion of the deployed portable and linkable executable files having the file format:

calculating a hash value of the pre-defined subset of the sections of the deployed portable and linkable executable file, looking up the calculated hash value of the deployed portable and linkable executable file in the mapping database, if the calculated hash value is found in the mapping database, creating an entry in the SBOM that includes at least:

(a) an identifier of the deployed portable and linkable executable file, (b) an identifier of the source portable and linkable executable file corresponding, based on the calculated hash value, to the deployed portable and linkable executable file, and (c) an identifier of the software package containing the source portable and linkable executable file, and if the calculated hash value is not found in the mapping database, creating an entry in the SBOM that includes at least:

(a) an identifier of the deployed portable and linkable executable file, and (b) an indicator that the deployed portable and linkable executable file is not associated with any of the software packages contained in the package repository.

For some applications, for each of the deployed portable and linkable executable files for which the hash value was found in the mapping database, creating the entry in the SBOM includes including the hash value in the entry.

For some applications, generating the SBOM includes generating the SBOM for all of the deployed portable and linkable executable files having the file format.

For some applications, the pre-defined subset of the sections includes a code segment.

For some applications, the pre-defined subset of the sections includes a data segment that includes initialized static variables.

For some applications, the pre-defined subset of the sections does not include a resource section.

For some applications, the pre-defined subset of the sections includes all sections specified by the file format other than sections included in a pre-defined blacklist that specifies sections for exclusion from the pre-defined subset.

For some applications, the method further includes defining a manifest specifying the sections of the pre-defined subset for the file format. For some of these applications, the manifest is a whitelisting manifest that lists the sections of the pre-defined subset. For others of these applications, the manifest is a blacklisting manifest that lists sections for exclusion from the pre-defined subset, and the pre-defined subset of the sections includes all sections specified by the file format other than the sections listed in the blacklisting manifest.

For some applications, the file format is selected from the group of file formats consisting of: portable Executable (PE) format and Executable and Linkable Format (ELF).

For some applications:

- the source portable and linkable executable files are in a plurality of different file formats,
- pre-defined subsets of the sections are respectively defined for the plurality of different file formats, and include fewer than all of the sections specified by the respective file formats,
- populating the mapping database includes, for each of the source portable and linkable executable files, calculating the hash value of the pre-defined subset of the sections defined for the file format of the source portable and linkable executable file, and
- generating the SBOM includes, for the at least a portion of the deployed portable and linkable executable files, calculating the hash value of the pre-defined subset of the sections defined for the file format of the deployed portable and linkable executable file.

For some applications, the method further includes defining, for each of the file formats, a manifest specifying the sections of the pre-defined subset.

For some applications, the method further includes populating a status indication data structure with respective status indicators for the software packages, each of the status indicators selected from a prespecified list of status indicators,

- wherein, for each of the deployed portable and linkable executable files for which the hash value was found in the mapping database, creating the entry in the SBOM includes:
  - including in the entry the status indicator of the software package containing the source portable and linkable executable file.

For some applications, the status indicators include a supported status indicator and a non-supported status indicator.

For some applications, the status indicators include a vulnerability status indicator.

For some applications, the status indicators include a licensing status indicator.

For some applications, the status indicators include a known bug status indicator.

For some applications, the method further includes associating respective rules with the status indicators.

For some applications, the method further includes, for each of the deployed portable and linkable executable files for which the hash value was found in the mapping database, triggering the rule associated with the status indicator of the software package containing the source portable and linkable executable file.

For some applications, for each of the deployed portable and linkable executable files for which the hash value was found in the mapping database, creating the entry in the SBOM includes including in the entry the rule associated with the status indicator of the software package containing the source portable and linkable executable file.

There is yet additionally provided, in accordance with an application of the present invention, a computing system for use with a package repository including software packages that include source portable and linkable executable files, the computing system including:

- a mapping database;
- one or more hardware processors; and
- one or more storage devices having stored computer-executable instructions that are executable by the one or more hardware processors for configuring the computing system to perform the following:
  - populating the mapping database by, for each of a plurality of the source portable and linkable executable files having a file format:
    - calculating a hash value of a pre-defined subset of sections of the source portable and linkable executable file, the pre-defined subset defined for the file format and including fewer than all of the sections specified by the file format; and
    - storing, in the mapping database, the calculated hash value in association with (a) an identifier of the source portable and linkable executable file and (b) an identifier of the software package of the source portable and linkable executable file; and
  - for at least a portion of deployed portable and linkable executable files that are included in a deployment package and have the file format:
    - calculating a hash value of the pre-defined subset of the sections of the deployed portable and linkable executable file,
    - looking up the calculated hash value of the deployed portable and linkable executable file in the mapping database,
    - if the calculated hash value is found in the mapping database, triggering a rule associated with a status of the software package containing the source portable and linkable executable file corresponding, based on the calculated hash value, to the deployed portable and linkable executable file, and
    - if the calculated hash value is not found in the mapping database, triggering a not-found rule.

For some applications, the computer-executable instructions are further executable for configuring the computing system to, upon triggering the not-found rule, invoke a process that publishes an alert message.

For some applications, the computer-executable instructions are further executable for configuring the computing system to calculate the hash value and look up the calculated hash value by calculating the hash value and looking up the calculated hash value for all of the deployed portable and linkable executable files having the file format.

For some applications, the pre-defined subset of the sections includes a code segment.

For some applications, the pre-defined subset of the sections includes a data segment that includes initialized static variables.

For some applications, the pre-defined subset of the sections does not include a resource section.

For some applications, the pre-defined subset of the sections includes all sections specified by the file format other than sections included in a pre-defined blacklist that specifies sections for exclusion from the pre-defined subset.

For some applications, the computer-executable instructions are further executable for configuring the computing system to define a manifest specifying the sections of the pre-defined subset for the file format. For some of these applications, the manifest is whitelisting manifest that lists the sections of the pre-defined subset. For others of these applications, the manifest is a blacklisting manifest that lists sections for exclusion from the pre-defined subset, and the pre-defined subset of the sections includes all sections specified by the file format other than the sections listed in the blacklisting manifest.

For some applications, the file format is selected from the group of file formats consisting of: portable Executable (PE) format and Executable and Linkable Format (ELF).

For some applications:

the source portable and linkable executable files are in a plurality of different file formats, pre-defined subsets of the sections are respectively defined for the plurality of different file formats, and include fewer than all of the sections specified by the respective file formats, the computer-executable instructions are further executable for configuring the computing system to populate the mapping database by, for each of the source portable and linkable executable files, calculating the hash value of the pre-defined subset of the sections defined for the file format of the source portable and linkable executable file, and the computer-executable instructions are further executable for configuring the computing system to calculate the hash value by, for the at least a portion of the deployed portable and linkable executable files, calculating the hash value of the pre-defined subset of the sections defined for the file format of the deployed portable and linkable executable file.

For some applications, the computer-executable instructions are further executable for configuring the computing system to define, for each of the file formats, a manifest specifying the sections of the pre-defined subset.

For some applications:

the computer-executable instructions are further executable for configuring the computing system to:

populate a status indication data structure with respective status indicators for the software packages, each of the status indicators selected from a prespecified list of status indicators, and associate respective rules with the status indicators, and the computer-executable instructions are further executable for configuring the computing system to, for each of the deployed portable and linkable executable files for which the hash value was found in the mapping database, trigger the rule associated with the status indicator of the software package containing the source portable and linkable executable file corresponding, based on the calculated hash value, to the deployed portable and linkable executable file.

For some applications, the rules include:

permitting deployment of the deployment package, and aborting the deployment of the deployment package.

For some applications, the rules include generating a message.

For some applications, the rules include creating a security item in a life cycle management tool associated with the deployment package.

For some applications, the status indicators include a supported status indicator and a non-supported status indicator.

For some applications, the status indicators include a vulnerability status indicator.

For some applications, the status indicators include a licensing status indicator.

For some applications, the status indicators include a known bug status indicator.

There is also provided, in accordance with an application of the present invention, a computing system for use with a package repository including software packages that include source portable and linkable executable files, the computing system including:

a mapping database;

one or more hardware processors; and one or more storage devices having stored computer-executable instructions that are executable by the one or more hardware processors for configuring the computing system to perform the following:

populating the mapping database by, for each of a plurality of the source portable and linkable executable files having a file format:

calculating a hash value of a pre-defined subset of sections of the source portable and linkable executable file, the pre-defined subset defined for the file format and including fewer than all of the sections specified by the file format; and storing, in the mapping database, the calculated hash value in association with (a) an identifier of the source portable and linkable executable file and (b) an identifier of the software package of the source portable and linkable executable file.

There is further provided, in accordance with an application of the present invention, a computing system for use w package repository including software packages that include source portable and linkable executable files, the computing system including:

a mapping database;

one or more hardware processors; and one or more storage devices having stored computer-executable instructions that are executable by the one or more hardware processors for configuring the computing system to perform the following:

for at least a portion of deployed portable and linkable executable files that are included in a deployment package and have a file format:

calculating a hash value of a pre-defined subset of sections of the deployed portable and linkable executable file, looking up the calculated hash value of the deployed portable and linkable executable file in the mapping database populated by, for each plurality of the source portable and linkable executable files having the file format:

calculating a hash value of the pre-defined subset of the sections of the source portable and linkable executable file, the pre-defined subset defined for the file format and including fewer than all of the sections specified by the file format; and storing, in the mapping database, the calculated hash value in association with (a) an identifier of the source portable and linkable executable file and (b) an identifier of the software package of the source portable and linkable executable file, if the calculated hash value is found in the mapping database, triggering a rule associated with a status of the software package containing the source portable and linkable executable file corresponding, based on the calculated hash value, to the deployed portable and linkable executable file, and if the calculated hash value is not found in the mapping database, triggering a not-found rule.

There is still further provided, in accordance with an application of the present invention, a computing system for use with a package repository including software packages that include source portable and linkable executable files, the computing system including:

a mapping database;

one or more hardware processors; and one or more storage devices having stored computer-executable instructions that are executable by the one or more hardware processors for configuring the computing system to perform the following:

populating a mapping database by, for each of a plurality of the source portable and linkable executable files having a file format:

calculating a hash value of a pre-defined subset of sections of the source portable and linkable executable file, the pre-defined subset defined for the file format and including fewer than all of the sections specified by the file format; and storing, in the mapping database, the calculated hash value in association with (a) an identifier of the source portable and linkable executable file and (b) an identifier of the software package of the source portable and linkable executable file; and generating a software bill of materials (SBOM) for a deployment package that includes deployed portable and linkable executable files, by, for at least a portion of the deployed portable and linkable executable files having the file format:

calculating a hash value of the pre-defined subset of the sections of the deployed portable and linkable executable file, looking up the calculated hash value of the deployed portable and linkable executable file in the mapping database, if the calculated hash value is found in the mapping database, creating an entry in the SBOM that includes at least:

(a) an identifier of the deployed portable and linkable executable file, (b) identifier of the source an portable and linkable executable file corresponding, based on the calculated hash value, to the deployed portable and linkable executable file, and (c) an identifier of the software package containing the source portable and linkable executable file, and if the calculated hash value is not found in the mapping database, creating an entry in the SBOM that includes at least:

(a) an identifier of the deployed portable and linkable executable file, and (b) an indicator that the deployed portable and linkable executable file is not associated with any of the software packages contained in the package repository.

For some applications, the computer-executable instructions are further executable for configuring the computing system to, for each of the deployed portable and linkable executable files for which the hash value was found in the mapping database, create the entry in the SBOM by including the hash value in the entry.

For some applications, the computer-executable instructions are further executable for configuring the computing system to generate the SBOM by generating the SBOM for all of the deployed portable and linkable executable files having the file format.

For some applications, the pre-defined subset of the sections includes a code segment.

For some applications, the pre-defined subset of the sections includes a data segment that includes initialized static variables.

For some applications, the pre-defined subset of the sections does not include a resource section.

For some applications, the pre-defined subset of the sections includes all sections specified by the file format other than sections included in a pre-defined blacklist that specifies sections for exclusion from the pre-defined subset.

For some applications, the computer-executable instructions are further executable for configuring the computing system to define a manifest specifying the sections of the pre-defined subset for the file format. For some of these applications, the manifest is a whitelisting manifest that lists the sections of the pre-defined subset. For others of these applications, the manifest is a blacklisting manifest that lists sections for exclusion from the pre-defined subset, and the pre-defined subset of the sections includes all sections specified by the file format other than the sections listed in the blacklisting manifest.

For some applications, the file format is selected from the group of file formats consisting of: portable Executable (PE) format and Executable and Linkable Format (ELF).

For some applications:

the source portable and linkable executable files are in a plurality of different file formats, pre-defined subsets of the sections are respectively defined for the plurality of different file formats, and include fewer than all of the sections specified by the respective file formats, the computer-executable instructions are further executable for configuring the computing system to populate the mapping database by, for each of the source portable and linkable executable files, calculating the hash value of the pre-defined subset of the sections defined for the file format of the source portable and linkable executable file, and the computer-executable instructions are further executable for configuring the computing system to generate the SBOM by, for the at least a portion of the deployed portable and linkable executable files, calculating the hash value of the pre-defined subset of the sections defined for the file format of the deployed portable and linkable executable file.

For some applications, the computer-executable instructions are further executable for configuring the computing system to define, for each of the file formats, a manifest specifying the sections of the pre-defined subset.

For some applications, the computer-executable instructions are further executable for configuring the computing system to populate a status indication data structure with respective status indicators for the software packages, each of the status indicators selected from a prespecified list of status indicators, the computer-executable instructions are further executable for configuring the computing system to, for each of the deployed portable and linkable executable files for which the hash value was found in the mapping database, create the entry in the SBOM by:

including in the entry the status indicator of the software package containing the source portable and linkable executable file.

For some applications, the status indicators include a supported status indicator and a non-supported status indicator.

For some applications, the status indicators include a vulnerability status indicator.

For some applications, the status indicators include a licensing status indicator.

For some applications, the status indicators include a known bug status indicator.

For some applications, the computer-executable instructions are further executable for configuring the computing system to associate respective rules with the status indicators.

For applications, some the computer-executable instructions are further executable for configuring the computing system to, for each of the deployed portable and linkable executable files for which the hash value was found in the mapping database, trigger the rule associated with the status indicator of the software package containing the source portable and linkable executable file.

For some applications, the computer-executable instructions are further executable for configuring the computing system to, for each of the deployed portable and linkable executable files for which the hash value was found in the mapping database, create the entry in the SBOM by including in the entry the rule associated with the status indicator of the software package containing the source portable and linkable executable file.

There is additionally provided, in accordance with an application of the present invention, a computer-program product tangibly embodied in a non-transitory machine-readable storage medium, including instructions configured to cause one or more hardware processors to perform operations, the computer-program product for use with a package repository including software packages that include source portable and linkable executable files, the computer-program product including:

populating a mapping database by, for each of a plurality of the source portable and linkable executable files having a file format:

calculating a hash value of a pre-defined subset of sections of the source portable and linkable executable file, the pre-defined subset defined for the file format and including fewer than all of the sections specified by the file format; and storing, in the mapping database, the calculated hash value in association with (a) an identifier of the source portable and linkable executable file and (b) an identifier of the software package of the source portable and linkable executable file; and for at least a portion of deployed portable and linkable executable files that are included in a deployment package and have the file format:

calculating a hash value of the pre-defined subset of the sections of the deployed portable and linkable executable file, looking up the calculated hash value of the deployed portable and linkable executable file in the mapping database, if the calculated hash value is found in the mapping database, triggering a rule associated with a status of the software package containing the source portable and linkable executable file corresponding, based on the calculated hash value, to the deployed portable and linkable executable file, and if the calculated hash value is not found in the mapping database, triggering a not-found rule.

There is yet additionally provided, in accordance with an application of the present invention, a computer-program product tangibly embodied in a non-transitory machine-readable storage medium, including instructions configured to cause one or more hardware processors to perform operations, the computer-program product for use with a package repository including software packages that include source portable and linkable executable files, the computer-program product including:

populating a mapping database by, for each of a plurality of the source portable and linkable executable files having a file format:

calculating a hash value of a pre-defined subset of sections of the source portable and linkable executable file, the pre-defined subset defined for the file format and including fewer than all of the sections specified by the file format; and storing, in the mapping database, the calculated hash value in association with (a) an identifier of the source portable and linkable executable file and (b) an identifier of the software package of the source portable and linkable executable file; and generating a software bill of materials (SBOM) for a deployment package that includes deployed portable and linkable executable files, by, for at least a portion of the deployed portable and linkable executable files having the file format:

calculating a hash value of the pre-defined subset of the sections of the deployed portable and linkable executable file, looking up the calculated hash value of the deployed portable and linkable executable file in the mapping database, if the calculated hash value is found in the mapping database, creating an entry in the SBOM that includes at least:

(a) an identifier of the deployed portable and linkable executable file, (b) an identifier of the source portable and linkable executable file corresponding, based on the calculated value, to the deployed portable and linkable executable file, and (c) an identifier of the software package containing the source portable and linkable executable file, and if the calculated hash value is not found in the mapping database, creating an entry in the SBOM that includes at least:
(a) an identifier of the deployed portable and linkable executable file, and
(b) an indicator that the deployed portable and linkable executable file is not associated with any of the software packages contained in the package repository.

The present invention will be more fully understood from the following detailed description of embodiments thereof, taken together with the drawings, in which:

BRIEF DESCRIPTION OF THE DRAWINGS

FIG. 5 is an exemplary status indication data structure, in accordance with an application of the present invention;

FIG. 7 is an exemplary SBOM, in accordance with an application of the present invention.

DETAILED DESCRIPTION OF APPLICATIONS

Figure 1:
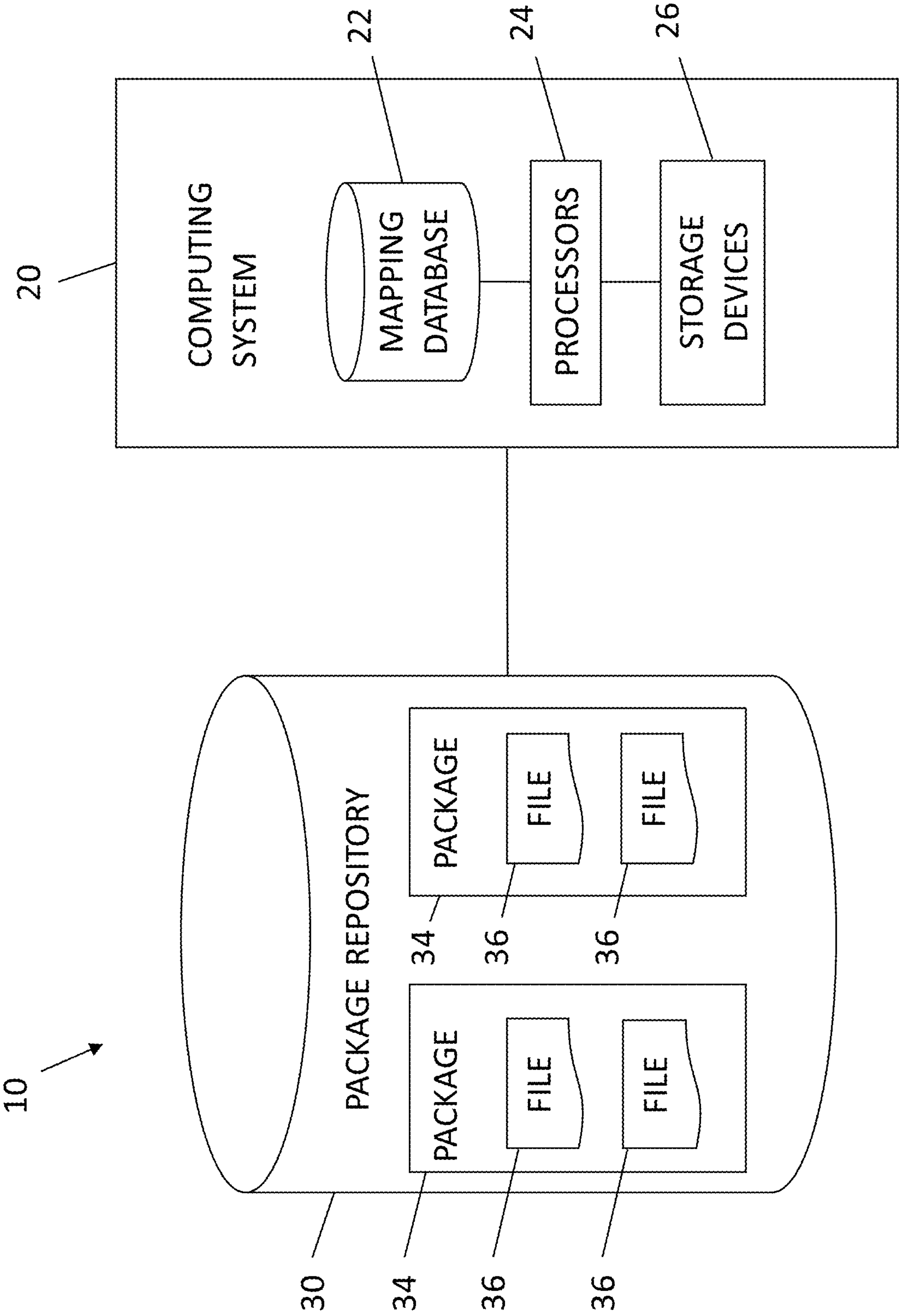
FIG. 1 is a schematic illustration of a development and deployment environment, in accordance with an application of the present invention.

FIG. 1 is a schematic illustration of a development and deployment environment 10, in accordance with an application of the present invention. Development and deployment environment 10 comprises a computing system 20, which comprises a mapping database 22, one or more hardware processors 24, and one or more storage devices 26 having stored computer-executable instructions that are executable by the one or more hardware processors 24 for configuring computing system 20 to perform the techniques described herein.

Development and deployment environment 10 further comprises a package repository 30 including software packages 34 that include a plurality of source portable and Typically, package linkable executable files 36. repository 30 includes at least some software packages 34 distributed by third parties unrelated to those managing development and deployment environment 10. For examples, the software packages may be managed using npm (npm, Inc., owned by Microsoft), NuGet, or Conan. Package repository 30 may further include software packages 34 that are proprietary to development and deployment environment 10.

Figure 2:
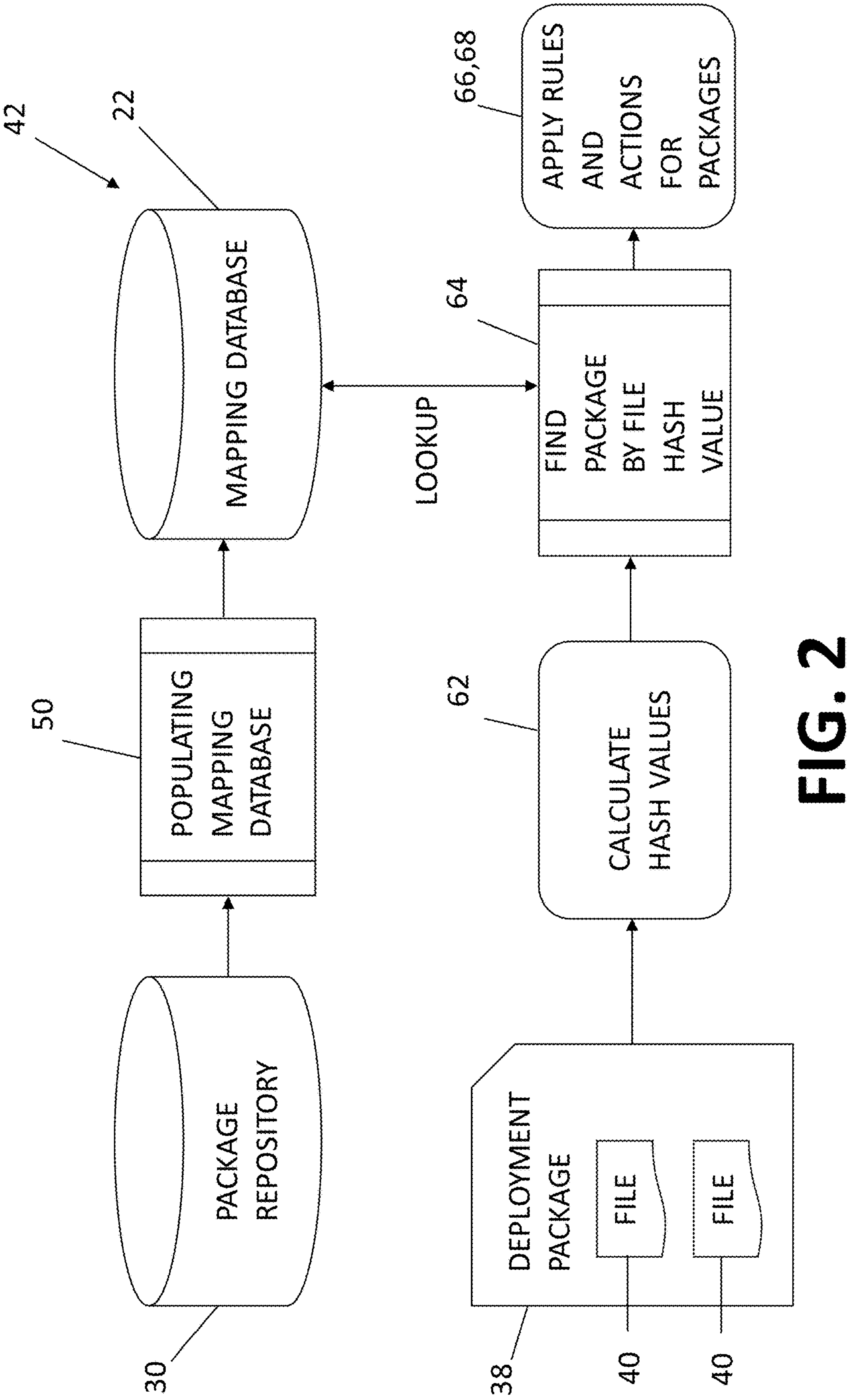
FIG. 2 is a schematic diagram illustrating elements of, and methods of using, the development and deployment environment of FIG. 1, in accordance with an application of the present invention.

Reference is still made to FIG. 1 and is further made to FIG. 2, which is a schematic diagram 42 illustrating elements of, and methods of using, development and deployment environment 10, in accordance with an application of the present invention. In particular, schematic diagram 42 shows mapping database 22 and package repository 30 of development and deployment environment 10.

Source portable and linkable executable files 36 of software packages 34 often undergo one or more transformations between initial downloading and distribution as deployed portable and linkable executable files 40 as part of a deployment package 38, e.g., during a Continuous Integration and Continuous Deployment (CI/CD) process. The transformations may include, for example, digital signing, re-versioning, attachment of debugging information, license updates, modification of icons, modification of metadata, and other non-functional modifications.

Thus, the deployed version of any given portable and linkable executable files may have a binary that differs from the original binary in its source software package 34. These differences may or may not contribute to the functionality or other deployment properties of the portable and linkable executable files.

Each of source portable and linkable executable files 36 has a file format. For some applications, all of source portable and linkable executable files 36 in package repository 30 share the same file format, while for other applications, different subsets of source portable and linkable executable files 36 have respective file formats, i.e., source portable and linkable executable files 36 have a plurality of different file formats. For example, the file formats may be Portable Executable (PE) format and/or Executable and Linkable Format (ELF), both as known in the art.

For some applications, deployment package 38 is a release candidate, which is evaluated and/or analyzed using some or all of the techniques described herein. For other applications, deployment package 38 is used in Integration and System Tests (e.g., in Continuous Integration and Continuous Deployment (CI/CD)), to produce feedback for the software developers regarding the state and quality of the components. For these purposes, deployment package 38 may be evaluated and/or analyzed using some or all of the techniques described herein, optionally using a different set of rules, since it is known to be a temporary version not intended for release. In this use, the techniques described herein typically trigger events in an issues tracking system, such as opening a bug or ticket when an issue is discovered.

Figure 3:
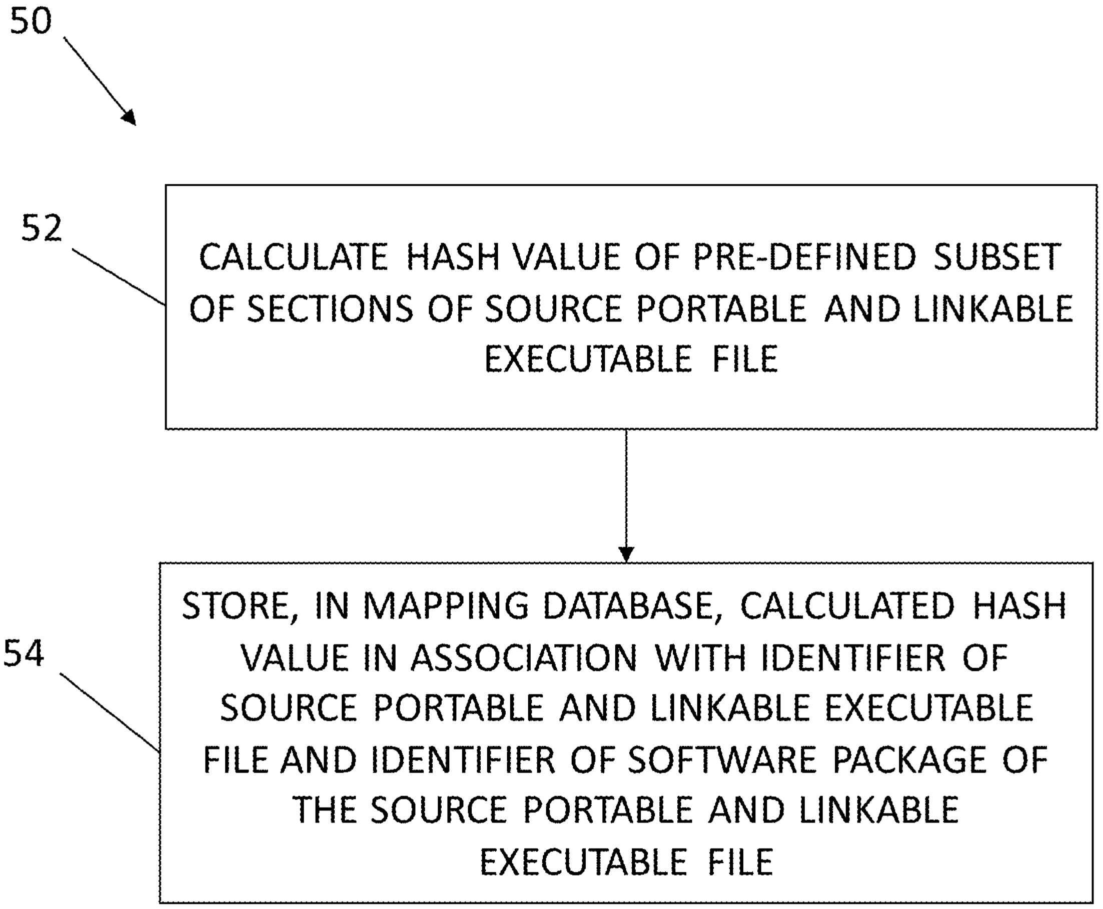
FIG. 3 is a flowchart schematically illustrating a computer-implemented mapping method for use with a package repository, in accordance with an application of the present invention.

Reference is still further made to FIG. 3, which is a flowchart schematically illustrating a computer-implemented mapping method 50 for use with package repository 30, in accordance with an application of the present invention. The steps of mapping method 50, as well as the other computer-implemented methods described herein, are typically performed by the execution by the one or more hardware processors 24 of the computer-executable instructions stored in the one or more storage devices 26. Optionally, the instructions are included in a computer-program product tangibly embodied in a non-transitory machine-readable storage medium, and the instructions are configured to cause one or more hardware processors to perform operations corresponding the steps of mapping method 50.

Mapping method 50 comprises populating mapping database 22 by, for each of the plurality of source portable and linkable executable files 36 having a file format:

at a mapping hashing step 52, calculating a hash value of a pre-defined subset of sections of the source portable and linkable executable file 36, the pre-defined subset defined for the file format and including fewer than all of the sections specified by the file format; and at a storage step 54, storing, in mapping database 22, the calculated hash value in association with (a) an identifier (e.g., a name) of the source portable and linkable executable file 36 and (b) an identifier (e.g., a name and version) of the software package 34 of the source portable and linkable executable file 36.

The pre-defined subset of sections of the source portable and linkable executable file 36 typically includes essential significant sections of the compiled source portable and linkable executable file 36, which contribute to the functionality of the code. For example, the pre-defined subset of the sections may include:

- a code segment (e.g., a .text section in PE format and in ELF),
- a data segment that includes initialized static variables, such as global variables and/or static local variables (e.g., a .data section in PE format and in ELF, and/or .pdata and/or .rdata sections in PE format),
- a segment including table of addresses that are filled in at runtime, in order to assist with dynamic linking (e.g., a .got segment in ELF),
- a segment that includes information for enabling dynamic function calls (e.g., a .plt segment in ELF), and/or
- a segment that includes metadata and control information used by a dynamic linker (e.g., a .dynamic segment in ELF).

By contrast, the pre-defined subset of sections of the source portable and linkable executable file 36 typically does not include non-essential sections of the compiled source portable and linkable executable file 36, which do not contribute to the functionality of the code. For example, the pre-defined subset of the sections typically does not include:

- a resource section (e.g., a .rsrc section in PE format, or a .rodata section in ELF, which may contain strings and constants) (which may, for example include icons, menus, dialog boxes, images, and/or other user-interface elements),
- a base relocations section (e.g., a .reloc section in PE format, or a .rel section and/or .rela section in ELF),
- any undefined regions within the sections in PE format, which typically include assembly signatures,
- a section used for uninitialized data (e.g., a .bss section in ELF),
- a section including debugging information generated by a compiler (e.g., a .debug section in ELF),
- a section including string tables (e.g., a .strtab section in ELF), and/or
- a section including a symbol table (e.g., a .symtab section in ELF).

In general, the deployed portable and linkable executable files 40 in deployment package 38 potentially include modifications only to sections of the source portable and linkable executable files 36 that are not included in the pre-defined subset of the sections of the portable executable files. These modifications generally are non-functional, in that they have no effect on the execution of the code, such as described hereinabove with reference to FIGS. 1 and 2.

For some applications, the pre-defined subset of the sections is specified by a whitelist of sections for inclusion in the pre-defined subset. For other applications, the pre-defined subset of the sections includes all sections specified by the file format other than sections included in a pre-defined blacklist that specifies sections for exclusion from the pre-defined subset.

For some applications, mapping method 50 further comprises defining a manifest listing the sections of the pre-defined subset for the file format. Providing one or more manifests may enable customization and adaptation to different deployment scenarios and environments. In these applications, in configurations in which source portable and linkable executable files 36 have a plurality of different file formats, as described hereinabove with reference to FIG. 1, mapping method 50 further comprises defining, for each of the file formats, a manifest listing the sections of the pre-defined subset.

For some applications, the manifest is a whitelisting manifest, which specifies the pre-defined subset by listing the sections to be included in the hashing process. For example, the pre-defined subset may include one or more the exemplary essential significant sections listed above, such as code and data segments. A whitelisting manifest specifies the inclusion of only the sections listed in the manifest, and the disregarding (non-inclusion) of all other unknown, and unexpected sections, including known, sections. For example, whitelisting may be most appropriate when mutations that each file undergoes during the development and release process are unknown and/or uncontrollable.

For other applications, the manifest is a blacklisting manifest, which specifies the pre-defined subset by listing the sections to be excluded in the hashing process. For example, the pre-defined excluded sections may include one or more the exemplary non-essential sections listed above, such as resources and assembly signatures. When a blacklisting manifest is used, the hash values for the pre-defined subset of sections are calculated by including all sections (known, unknown, and unexpected) specified by the file type, other than those listed in the blacklisting manifest. For example, a blacklisting manifest may useful when it is desired to ignore certain type(s) of changes (e.g., icons, signing, and/or versioning) when calculating the hash values, but to receive different hash values for other unpredictable modifications.

Mapping method 50 is performed upon initial creation of mapping database 22, and is typically additionally performed upon each subsequent update to package repository 30 that affects software packages 34 thereof. For example, mapping method 50 may be performed during availability maintenance, i.e., the general maintenance of the service, which ensures that the service is active and reachable and has the required resources and capacity to respond to all the requests quickly enough.

Figure 4:
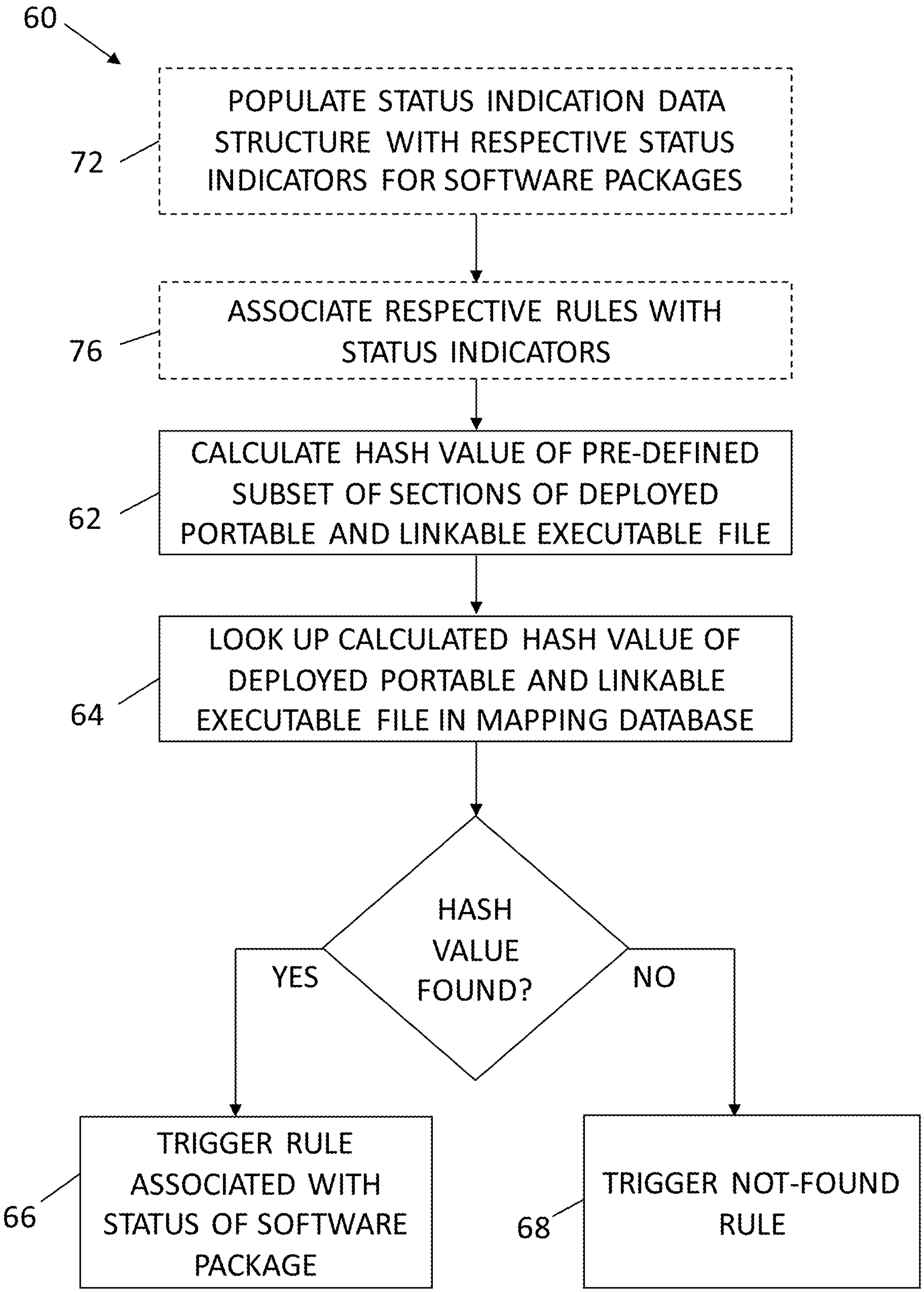
FIG. 4 is a flowchart schematically illustrating a computer-implemented deployment package assessment method for use with a mapping database, in accordance with an application of the present invention.

Reference is made to FIG. 4, which is a flowchart schematically illustrating a computer-implemented deployment package assessment method 60 for use with mapping database 22, in accordance with an application of the present invention. Typically, deployment package assessment method 60 is performed after one or more performances of mapping method 50 to populate mapping database 22, as described hereinabove with reference to FIGS. 2 and 3. Alternatively, mapping database 22 is provided in some other manner, e.g., imported from a source external to computing system 20.

Deployment package assessment method 60 attempts to quickly match deployed portable and linkable executable file 40 with their respective source software packages 34, even though deployed portable and linkable executable files 40 often differ from their corresponding source portable and linkable executable files 36 in ways that do not contribute to the functionality of the executable files.

Deployment package assessment method 60 comprises, for at least a portion of (e.g., all of) deployed portable and linkable executable files 40 that are included in deployment package 38 and have the file format of the source portable and linkable executable files 36 stored in mapping database 22 as described hereinabove in mapping method 50:

at an assessment hashing step 62, calculating a hash value of the pre-defined subset of the sections of the deployed portable and linkable executable file 40, at an assessment hash-value lookup step 64, looking up the calculated hash value of the deployed portable and linkable executable file 40 in mapping database 22 (in order to find the associated software package 34, if any), at a hash-value-found rule trigger step 66, if the calculated hash value is found in mapping database 22, triggering a rule associated with a status of the software package 34 containing the source portable and linkable executable file 36 corresponding, based on the calculated hash value, to the deployed portable and linkable executable file 40, and at a hash-value-not-found rule trigger step 68, if the calculated hash value is not found in mapping database 22, triggering a not-found rule.

As described above, the hash values are calculated only for the pre-defined subset of the sections at both mapping hashing step 52 and assessment hashing step 62. Therefore, if the deployed portable and linkable executable file 40 does not have any significant differences from the source portable and linkable executable file 36, the respective hash values are more likely to match than if the hash values were calculated for the entirety of the deployed portable and linkable executable file 40 and the source portable and linkable executable file 36. This increased likelihood increases the accuracy of correct matching and reduces the occurrence of false negative failed matches. In the absence of the techniques described herein, failed matches may often be considered false negatives in the sense that the lack of matching does not reflect any change to the functionality of the deployed code.

For some applications, triggering the not-found rule invokes a process that publishes an alert message, typically to another program or to a human user.

Reference is still made to FIG. 4, and is additionally made to FIG. 5, which is an exemplary status indication data structure 70, in accordance with an application of the present invention. Exemplary status indication data structure 70 is shown as including exemplary data. In actual practice, status indication data structure 70 may include additional or fewer fields than shown.

For some applications, deployment package assessment method 60 further comprises, before performing hash-value-found rule trigger step 66, described hereinabove with reference to FIG. 4:

at a status-indication step 72, populating status indication data structure 70 with respective status indicators 74 for software packages 34, each of status indicators 74 selected from a prespecified list of status indicators, and at a rule association step 76, associating respective rules with status indicators 74.

For example, each of software packages 34 may be represented in status indication data structure 70 by an identifier 94 (e.g., a name and version) of the software package 34.

At hash-value-found rule trigger step 66, for each of the deployed portable and linkable executable files 40 for which the hash value was found in mapping database 22, triggering the rule comprises triggering the rule associated with the status indicator 74 of the software package 34 containing the source portable and linkable executable file 36 corresponding, based on the calculated hash value, to the deployed portable and linkable executable file 40.

By way of example and not limitation, the rules may include one or more of the following:

permitting deployment of deployment package 38, aborting the deployment of deployment package 38 (such as if the deployed portable and linkable executable file 40 is from a deployment package 38 that is out of support, vulnerable, or not approved for legal reasons), generating a message, creating a report in a bug-tracking tool, and/or creating a security item in a life cycle management tool associated with deployment package 38.

By way of example and not limitation, status indicators 74 may include one or more of the following:

a supported status indicator (which may, for example, be associated with a rule that specifies permitting deployment of deployment package 38), a non-supported status indicator (which may, for example, be associated with a rule that specifies aborting the deployment of deployment package 38), a vulnerability status indicator (which may, for example, (i) reflect a previously known vulnerability, which may, for example, be associated with a rule that specifies aborting the deployment of deployment package 38, or (ii) reflect a newly discovered vulnerability, which may, for example, be associated with a rule that specifies creating a security item in a life cycle management tool associated with deployment package 38), a licensing status indicator (which may, for example, indicate that the package license is not approved for distribution, which may, for example, be associated with a rule that specifies aborting the deployment of deployment package 38 and/or generating an alert to a legal department), and/or a known bug status indicator (which may, for example, be associated with a rule that specifies creating a report in a bug-tracking tool).

Figure 6:
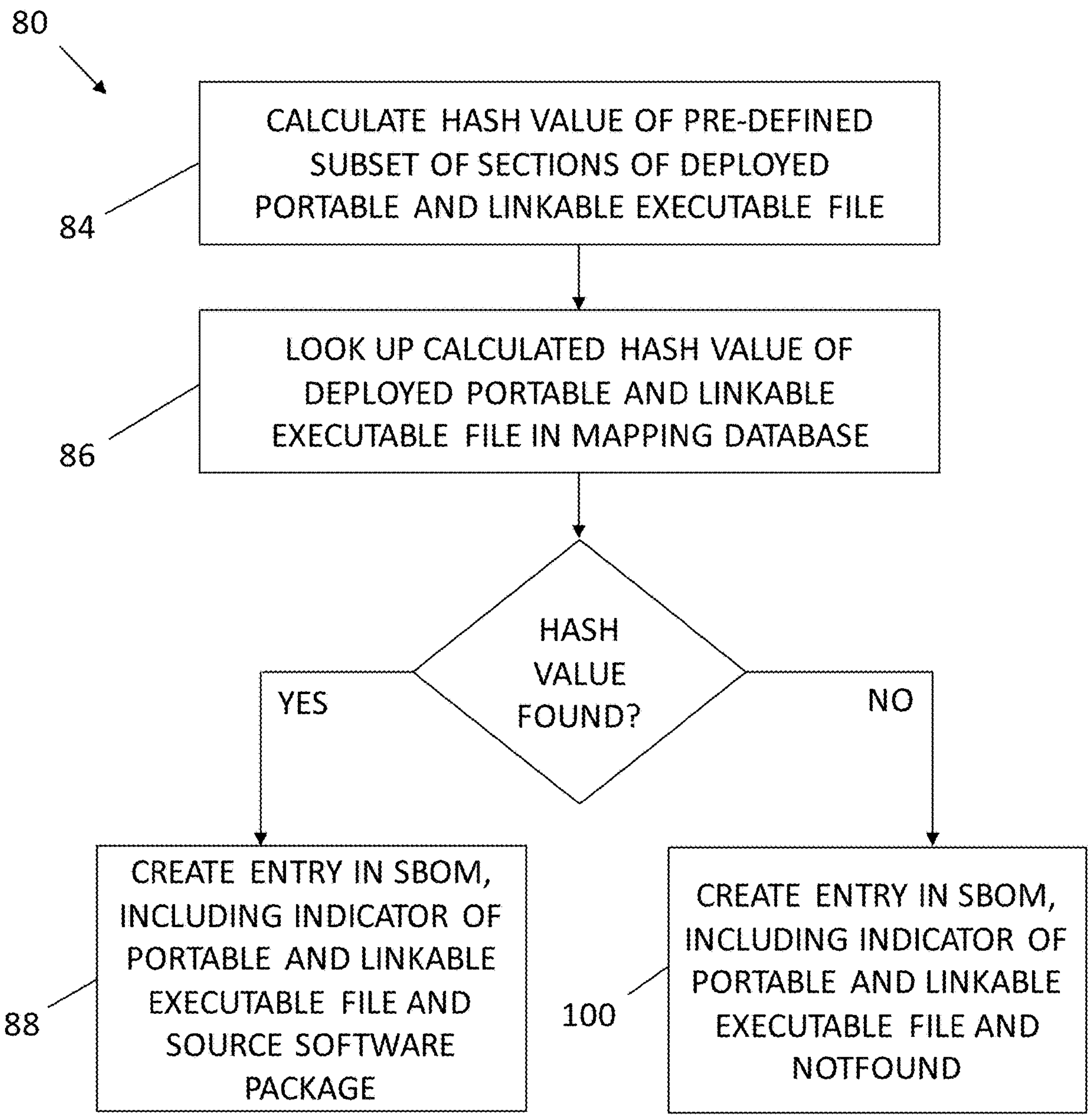
FIG. 6 is a flowchart schematically illustrating a computer-implemented method for generating a software bill of materials (SBOM) for a deployment package, in accordance with an application of the present invention.

Reference is now made to FIG. 6, which is a flowchart schematically illustrating a computer-implemented method 80 for generating a software bill of materials (SBOM) 82 for deployment package 38, in accordance with an application of the present invention.

Reference is further made to additionally made to FIG. 7, which is an exemplary SBOM 82, in accordance with an application of the present invention. Exemplary SBOM 82 is shown as including exemplary data. In actual practice, SBOM 82 may include additional or fewer fields than shown, and generally includes substantially more entries that shown.

Optionally, deployment package assessment method 60, described hereinabove with reference to FIGS. 4 and 5, utilizes an SBOM 82 generated using SBOM-generation method 80. Alternatively, deployment package assessment method 60 is performed without using an SBOM 82.

Typically, SBOM-generation method 80 is performed after one or more performances of mapping method 50 to populate mapping database 22, as described hereinabove with reference to FIGS. 2 and 3. Alternatively, mapping database 22 is provided in some other manner, e.g., imported from a source external to computing system 20. SBOM-generation method 80 may be performed instead or in addition to deployment package assessment method 60, described hereinabove with reference to FIGS. 4 and 5; for example, the two methods may optionally be integrated with each other, for example as described below.

SBOM-generation method 80 comprises generating SBOM 82 for deployment package 38 that includes deployed portable and linkable executable files 40, by, for at least a portion of (e.g., all of) the deployed portable and linkable executable files 40 having the file format of the source portable and linkable executable files 36 stored in mapping database 22 as described hereinabove in mapping method 50:

at an SBOM-generation hashing step 84, calculating a hash value 85 of the pre-defined subset of the sections of the deployed portable and linkable executable file 40, and at an SBOM-generation lookup step 86, looking up the calculated hash value 85 of the deployed portable and linkable executable file 40 in mapping database 22.

If the calculated hash value 85 is found in mapping database 22 at SBOM-generation lookup step 86, at an SBOM entry creation step 88 an entry 90 is created in SBOM 82 that includes at least:

an identifier 92 (e.g., a name) of the deployed portable and linkable executable file 40 (which corresponds to the deployed portable and linkable executable file 40, based on the calculated hash value 85), an identifier 94 (e.g., a name and version) of the software package 34 containing the source portable and linkable executable file 36, and optionally, hash value 85.

On the other hand, if the calculated hash value is not found in mapping database 22 at SBOM-generation lookup step 86, at an SBOM entry creation step 100, an entry 102 is created in SBOM 82 that includes at least:

identifier 92 of the deployed portable and linkable executable file 40, and an indicator 104 that the deployed portable and linkable executable file 40 is not associated with any of the software packages 34 contained in package repository 30.

The resulting SBOM 82 is generally more accurate than conventional SBOMs, because matches are made between deployed portable and linkable executable files 40 and their source portable and linkable executable files 36 even if the executable files differ in non-functional ways, such as described above. In addition, unlike conventional SBOMs, SBOM 82 includes deployed portable and linkable executable files 40 that cannot be found in any of the software packages 34 contained in package repository 30; these unidentified deployed portable and linkable executable files 40 are flagged with indicator 104, as described immediately above.

For some applications, SBOM-generation method 80 further comprises populating status indication data structure 70 with respective status indicators 74 for software packages 34, each of status indicators 74 selected from a prespecified list of status indicators, such as described hereinabove with reference to FIGS. 4 and 5 at status-indication step 72. In these applications, at SBOM entry creation step 88, for each of the deployed portable and linkable executable files 40 for which the hash value was found in mapping database 22, creating entry 102 in SBOM 82 comprises: including in entry 102 the status indicator 74 of the software package 34 containing the source portable and linkable executable file 36. Status indicators 74 may include any of status indicators 74 described hereinabove with reference to FIGS. 4 and 5.

For some applications, SBOM-generation method 80 further comprises associating respective rules with status indicators 74, such as described hereinabove with reference to FIGS. 4 and 5.

For some of these applications, SBOM-generation method 80 further comprises, for each of the deployed portable and linkable executable files 40 for which the hash value was found mapping database 22, triggering the rule associated with the status indicator 74 of the software package 34 containing the source portable and linkable executable file 36, such as described hereinabove with reference to FIGS. 4 and 5.

Alternatively or additionally, for some of these applications, for each of the deployed portable and linkable executable files 40 for which the hash value was found in mapping database 22, creating entry 102 in SBOM 82 comprises including in entry 102 the rule associated with the status indicator 74 of the software package 34 containing the source portable and linkable executable file 36.

The foregoing methods may be practiced by a computer system including one or more processors and computer-readable media such as computer memory. In particular, the computer memory may store computer-executable instructions that when executed by one or more processors cause various functions to be performed, such as the acts recited in the embodiments.

In this regard, embodiments of the present invention may comprise or utilize a special purpose or general-purpose computer including computer hardware. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are hardware storage devices, also referred to herein as physical storage media. Computer-readable media that carry computer-executable instructions are transmission media. Thus, by way of example, and not limitation, embodiments of the invention can comprise at least two distinctly different kinds of computer-readable media: (i) physical computer-readable storage media (e.g., hardware storage devices), and (ii) transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other hardware storage devices which can be used to store desired program code means in the form of computer-executable instructions or data structures and which can be accessed by a general purpose or special purpose computer.

Computer-executable instructions comprise, for example, instructions and data which cause a general-purpose computer, special purpose computer, or special purpose processing device to perform a certain function or group of functions when executed by a hardware processor. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCS, minicomputers, mainframe computers, mobile telephones, PDAS, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICS), Program-specific Standard Products (ASSPs), System-on-a-chip systems (SOCs), Complex Programmable Logic Devices (CPLDs), etc.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A computer-implemented method for use with a package repository including software packages that include source portable and linkable executable files, the method comprising:

populating a mapping database by, for each of a plurality of the source portable and linkable executable files having a file format:

calculating a hash value of a pre-defined subset of sections of the source portable and linkable executable file, the pre-defined subset defined for the file format and including some of and fewer than all of the sections specified by the file format; and storing, in the mapping database, the calculated hash value in association with (a) an identifier of the source portable and linkable executable file and (b) an identifier of the software package of the source portable and linkable executable file;

for at least a portion of deployed portable and linkable executable files that are included in a deployment package and have the file format:

calculating a hash value of the pre-defined subset of the sections of the deployed portable and linkable executable file, looking up the calculated hash value of the deployed portable and linkable executable file in the mapping database, if the calculated hash value is found in the mapping database, triggering a rule associated with a status of the software package containing the source portable and linkable executable file corresponding, based on the calculated hash value, to the deployed portable and linkable executable file, and if the calculated hash value is not found in the mapping database, triggering a not-found rule;

populating a status indication data structure with respective status indicators for the software packages, each of the status indicators selected from a prespecified list of status indicators; and associating respective rules with the status indicators, wherein, for each of the deployed portable and linkable executable files for which the hash value was found in the mapping database, triggering the rule comprises triggering the rule associated with the status indicator of the software package containing the source portable and linkable executable file corresponding, based on the calculated hash value, to the deployed portable and linkable executable file.

2. The method according to claim 1, wherein the pre-defined subset of the sections includes a code segment.

3. The method according to claim 1, wherein the pre-defined subset of the sections does not include a resource section.

4. The method according to claim 1, wherein the pre-defined subset of the sections includes all sections specified by the file format other than sections included in a pre-defined blacklist that specifies sections for exclusion from the pre-defined subset.

5. The method according to claim 1, further comprising defining a manifest specifying the sections of the pre-defined subset for the file format, wherein the manifest is a white-listing manifest that lists the sections of the pre-defined subset.

6. The method according to claim 1, wherein the rules include:

permitting deployment of the deployment package, and aborting the deployment of the deployment package.

7. The method according to claim 1, wherein the status indicators include one or more of the following: a supported status indicator, a non-supported status indicator, a vulnerability status indicator, a licensing status indicator, and a known bug status indicator.

8. A computing system for use with a package repository including software packages that include source portable and linkable executable files, the computing system comprising:

a mapping database;

one or more hardware processors; and one or more storage devices having stored computer-executable instructions that are executable by the one or more hardware processors for configuring the computing system to perform the following:

populating the mapping database by, for each of a plurality of the source portable and linkable executable files having a file format:

calculating a hash value of a pre-defined subset of sections of the source portable and linkable executable file, the pre-defined subset defined for the file format and including some of and fewer than all of the sections specified by the file format; and storing, in the mapping database, the calculated hash value in association with (a) an identifier of the source portable and linkable executable file and (b) an identifier of the software package of the source portable and linkable executable file, for at least a portion of deployed portable and linkable executable files that are included in a deployment package and have the file format:

calculating a hash value of the pre-defined subset of the sections of the deployed portable and linkable executable file, looking up the calculated hash value of the deployed portable and linkable executable file in the mapping database, if the calculated hash value is found in the mapping database, triggering a rule associated with a status of the software package containing the source portable and linkable executable file corresponding, based on the calculated hash value, to the deployed portable and linkable executable file, and if the calculated hash value is not found in the mapping database, triggering a not-found rule, populate a status indication data structure with respective status indicators for the software packages, each of the status indicators selected from a prespecified list of status indicators, and associate respective rules with the status indicators, wherein the computer-executable instructions are further executable for configuring the computing system to, for each of the deployed portable and linkable executable files for which the hash value was found in the mapping database, trigger the rule associated with the status indicator of the software package containing the source portable and linkable executable file corresponding, based on the calculated hash value, to the deployed portable and linkable executable file.

9. The computing system according to claim 8, wherein the pre-defined subset of the sections includes a code segment.

10. The computing system according to claim 8, wherein the pre-defined subset of the sections does not include a resource section.

11. The computing system according to claim 8, wherein the pre-defined subset of the sections includes all sections specified by the file format other than sections included in a pre-defined blacklist that specifies sections for exclusion from the pre-defined subset.

12. The computing system according to claim 8, wherein the computer-executable instructions are further executable for configuring the computing system to define a manifest specifying the sections of the pre-defined subset for the file format, wherein the manifest is a whitelisting manifest that lists the sections of the pre-defined subset.

13. The computing system according to claim 8, wherein the rules include:

permitting deployment of the deployment package, and aborting the deployment of the deployment package.

14. The computing system according to claim 8, wherein the status indicators include one or more of the following: a supported status indicator, a non-supported status indicator, a vulnerability status indicator, a licensing status indicator, and a known bug status indicator.

15. A computer-implemented method for use with a package repository including software packages that include source portable and linkable executable files, the method comprising:

populating a mapping database by, for each of a plurality of the source portable and linkable executable files having a file format:

calculating a hash value of a pre-defined subset of sections of the source portable and linkable executable file, the pre-defined subset defined for the file format and including some of and fewer than all of the sections specified by the file format; and storing, in the mapping database, the calculated hash value in association with (a) an identifier of the source portable and linkable executable file and (b) an identifier of the software package of the source portable and linkable executable file:

generating a software bill of materials (SBOM) for a deployment package that includes deployed portable and linkable executable files, by, for at least a portion of the deployed portable and linkable executable files having the file format:

calculating a hash value of the pre-defined subset of the sections of the deployed portable and linkable executable file, looking up the calculated hash value of the deployed portable and linkable executable file in the mapping database, if the calculated hash value is found in the mapping database, creating an entry in the SBOM that includes at least:

(a) an identifier of the deployed portable and linkable executable file, (b) an identifier of the source portable and linkable executable file corresponding, based on the calculated hash value, to the deployed portable and linkable executable file, and (c) an identifier of the software package containing the source portable and linkable executable file, and if the calculated hash value is not found in the mapping database, creating an entry in the SBOM that includes at least:

(a) an identifier of the deployed portable and linkable executable file, and (b) an indicator that the deployed portable and linkable executable file is not associated with any of the software packages contained in the package repository.

16. The method according to claim 15, further comprising populating a status indication data structure with respective status indicators for the software packages, each of the status indicators selected from a prespecified list of status indicators, wherein, for each of the deployed portable and linkable executable files for which the hash value was found in the mapping database, creating the entry in the SBOM comprises:

including in the entry the status indicator of the software package containing the source portable and linkable executable file.

17. The method according to claim 16, further comprising:

associating respective rules with the status indicators; and for each of the deployed portable and linkable executable files for which the hash value was found in the mapping database, triggering the rule associated with the status indicator of the software package containing the source portable and linkable executable file.

18. The method according to claim 15, wherein the pre-defined subset of the sections includes (a) a code segment and (b) a data segment that includes initialized static variables.

19. A computing system for use with a package repository including software packages that include source portable and linkable executable files, the computing system comprising:

a mapping database;

one or more hardware processors; and one or more storage devices having stored computer-executable instructions that are executable by the one or more hardware processors for configuring the computing system to perform the following:

populating the mapping database by, for each of a plurality of the source portable and linkable executable files having a file format:

calculating a hash value of a pre-defined subset of sections of the source portable and linkable executable file, the pre-defined subset defined for the file format and including some of and fewer than all of the sections specified by the file format; and storing, in the mapping database, the calculated hash value in association with (a) an identifier of the source portable and linkable executable file and (b) an identifier of the software package of the source portable and linkable executable file; and generating a software bill of materials (SBOM) for a deployment package that includes deployed portable and linkable executable files, by, for at least a portion of the deployed portable and linkable executable files having the file format:

calculating a hash value of the pre-defined subset of the sections of the deployed portable and linkable executable file, looking up the calculated hash value of the deployed portable and linkable executable file in the mapping database, if the calculated hash value is found in the mapping database, creating an entry in the SBOM that includes at least:

(a) an identifier of the deployed portable and linkable executable file, (b) an identifier of the source portable and linkable executable file corresponding, based on the calculated hash value, to the deployed portable and linkable executable file, and (c) an identifier of the software package containing the source portable and linkable executable file, and if the calculated hash value is not found in the mapping database, creating an entry in the SBOM that includes at least:

(a) an identifier of the deployed portable and linkable executable file, and (b) an indicator that the deployed portable and linkable executable file is not associated with any of the software packages contained in the package repository.

20. The computing system according to claim 19, wherein the computer-executable instructions are further executable for configuring the computing system to populate a status indication data structure with respective status indicators for the software packages, each of the status indicators selected from a prespecified list of status indicators, wherein the computer-executable instructions are further executable for configuring the computing system to, for each of the deployed portable and linkable executable files for which the hash value was found in the mapping database, create the entry in the SBOM by:

including in the entry the status indicator of the software package containing the source portable and linkable executable file.

21. The computing system according to claim 20, wherein the computer-executable instructions are further executable for configuring the computing system to:

associate respective rules with the status indicators, and for each of the deployed portable and linkable executable files for which the hash value was found in the mapping database, trigger the rule associated with the status indicator of the software package containing the source portable and linkable executable file.

22. The computing system according to claim 19, wherein the pre-defined subset of the sections includes (a) a code segment and (b) a data segment that includes initialized static variables.

23. A computing system for use with a package repository including software packages that include source portable and linkable executable files, the computing system comprising:

a mapping database:

one or more hardware processors; and one or more storage devices having stored computer-executable instructions that are executable by the one or more hardware processors for configuring the computing system to perform the following:

populating the mapping database by, for each of a plurality of the source portable and linkable executable files having a file format:

calculating a hash value of a pre-defined subset of sections of the source portable and linkable executable file, the pre-defined subset defined for the file format and including some of and fewer than all of the sections specified by the file format; and storing, in the mapping database, the calculated hash value in association with (a) an identifier of the source portable and linkable executable file and (b) an identifier of the software package of the source portable and linkable executable file, wherein the pre-defined subset of the sections includes (a) a code segment and (b) a data segment that includes initialized static variables.

24. The computing system according to claim 23, wherein the computer-executable instructions are further executable for configuring the computing system to perform the following:

for at least a portion of deployed portable and linkable executable files that are included in a deployment package and have the file format:

calculating a hash value of the pre-defined subset of the sections of the deployed portable and linkable executable file, looking up the calculated hash value of the deployed portable and linkable executable file in the mapping database, if the calculated hash value is found in the mapping database, triggering a rule associated with a status of the software package containing the source portable and linkable executable file corresponding, based on the calculated hash value, to the deployed portable and linkable executable file, and if the calculated hash value is not found in the mapping database, triggering a not-found rule.

25. The computing system according to claim 24, wherein the computer-executable instructions are further executable for configuring the computing system to:

populate a status indication data structure with respective status indicators for the software packages, each of the status indicators selected from a prespecified list of status indicators, and associate respective rules with the status indicators, and wherein the computer-executable instructions are further executable for configuring the computing system to, for each of the deployed portable and linkable executable files for which the hash value was found in the mapping database, trigger the rule associated with the status indicator of the software package containing the source portable and linkable executable file corresponding, based on the calculated hash value, to the deployed portable and linkable executable file.

26. A computer-implemented method for use with a package repository including software packages that include source portable and linkable executable files, the method comprising:

populating a mapping database by, for each of a plurality of the source portable and linkable executable files having a file format:

calculating a hash value of a pre-defined subset of sections of the source portable and linkable executable file, the pre-defined subset defined for the file format and including some of and fewer than all of the sections specified by the file format; and storing, in the mapping database, the calculated hash value in association with (a) an identifier of the source portable and linkable executable file and (b) an identifier of the software package of the source portable and linkable executable file, wherein the pre-defined subset of the sections includes (a) a code segment and (b) a data segment that includes initialized static variables.

27. The method according to claim 26, further comprising, for at least a portion of deployed portable and linkable executable files that are included in a deployment package and have the file format:

calculating a hash value of the pre-defined subset of the sections of the deployed portable and linkable executable file, looking up the calculated hash value of the deployed portable and linkable executable file in the mapping database, if the calculated hash value is found in the mapping database, triggering a rule associated with a status of the software package containing the source portable and linkable executable file corresponding, based on the calculated hash value, to the deployed portable and linkable executable file, and if the calculated hash value is not found in the mapping database, triggering a not-found rule.

28. The method according to claim 27, wherein the method further comprises:

populating a status indication data structure with respective status indicators for the software packages, each of the status indicators selected from a prespecified list of status indicators, and associating respective rules with the status indicators, and wherein, for each of the deployed portable and linkable executable files for which the hash value was found in the mapping database, triggering the rule comprises triggering the rule associated with the status indicator of the software package containing the source portable and linkable executable file corresponding, based on the calculated hash value, to the deployed portable and linkable executable file.

* * * * *